United States Patent [19]

Rosen

[11] Patent Number: 4,670,959
[45] Date of Patent: Jun. 9, 1987

[54] METHOD AND MEANS FOR ADAPTING PLUMBING VALVE STEMS TO DESIRED TRIM

[76] Inventor: Richard A. Rosen, 3934 Corbin Ave., Tarzana, Calif. 91356

[21] Appl. No.: 808,270

[22] Filed: Dec. 12, 1985

[51] Int. Cl.⁴ .................. B21K 21/16; B23P 17/04; B23P 19/04
[52] U.S. Cl. .................. 29/401.1; 29/234; 29/402.08; 29/464; 29/DIG. 1
[58] Field of Search ............ 29/401.1, 402.06, 402.08, 29/402.11, 402.18, 406, 426.2, 157 R, 157.1 R, 157.1 A, 426.4, 464, 526 R, 234, 240, 282, DIG. 1, DIG. 26, DIG. 55, DIG. 98; 4/DIG. 7, 191, 192; 137/315

[56] References Cited

U.S. PATENT DOCUMENTS 1,509,430  9/1924  Horsburgh .................. 29/157.1
2,266,702 12/1941  Byers ........................ 29/402.18

FOREIGN PATENT DOCUMENTS

3045227 10/1981  Fed. Rep. of Germany ... 4/DIG. 7
3144591  8/1982  Fed. Rep. of Germany ... 4/DIG. 7
3234643  3/1984  Fed. Rep. of Germany ... 4/DIG. 7

Primary Examiner—Mark Rosenbaum
Assistant Examiner—Irene Graves Golabi
Attorney, Agent, or Firm—Bryant R. Gold

[57] ABSTRACT

A method and means for adapting a stem of a plumbing valve for use with plumbing trim of a type for which the plumbing valve stem was not originally designed to be used. In one embodiment, a spindle is milled on the end of the stem. The spindle is milled through the use of a centering tool that slides over the stem and a hollow mill that is rotated by a hand-held power tool, such as an electric drill, which hollow mill is aligned with the longitudinal axis of the stem by the centering tool as the milling operation is carried out. An adaptor, made from a rod having substantially the same diameter as the stem, has a receiving hole bored in one end thereof into which the spindle is inserted. At least one pin is then passed transversely through both the adaptor and the spindle so as to lock rotation of one to rotation of the other, and to prevent the adaptor from disengaging the spindle. The other end of the adaptor has a spline thereon that matches a keyway of the plumbing trim that is to be used. In another embodiment, an axial hole is drilled in the end of the stem into which a spindle of a second type of adaptor may be inserted. The spindle of the adaptor is lockingly engaged with the stem by at least one transverse pin that passes through both the stem and spindle. The other end of the second type of adaptor has a spline thereon that matches a keyway of the plumbing trim that is to be used.

25 Claims, 19 Drawing Figures

METHOD AND MEANS FOR ADAPTING PLUMBING VALVE STEMS TO DESIRED TRIM

BACKGROUND OF THE INVENTION

The present invention relates to the interchangeability of plumbing supplies, and more particularly to a method and means for adapting the stem of a plumbing valve unit so that a desired type of plumbing trim can be used therewith, even through the desired plumbing trim is initially incompatible with the stem.

For purposes of the invention described herein, the term "plumbing trim" will be used to described those components of a plumbing fixture that are readily visible and accessible to a user. Of particular import to the present invention, the term "plumbing trim" includes a handle that engages a stem or shaft of a plumbing valve. By manually turning the handle, the valve can be fully opened, closed, or set to any position inbetween, thereby allowing hot and/or cold water to be selectively delivered to a nearby spout. In order for the handle to securely grip the valve to which it is attached, so that any rotation of the handle is transferred to an equivalent rotation of the valve stem, it is common in the art to have a spline or key-pattern at the end of the valve shaft. A mating or matching keyway is then included as an integral part of the handle. The spline of the stem then fits snugly into the keyway of the handle or trim, typically secured by an axial screw, and the fitted spline/keyway thus provides for the efficient transfer of torque from the handle to the stem. That is, the spline of the stem acts as a key that becomes lockingly engaged with the keyway of the handle so that the handle cannot turn without also turning the valve stem. The axial screw does not contribute to the transfer of torque from the trim to the stem, rather it merely ensures that the spline and keyway remain lockingly engaged and do not axially separate.

It is common in the art for plumbing valve manufacturers to provide both the plumbing valve—that unit which is mounted behind the wall or under the counter—as well as the plumbing trim that is used therewith. Most manufacturers, in fact, incorporate a unique spline/keyway design for their valve stem/trim combinations so that only their trim can be used with their valves. In other words, in general, there is no valve/trim compatibility in the plumbing industry. Thus, in general, Price Pfister trim can be only be used with Price Pfister valves; American Standard trim can only be used with American Standard valves; Borg Warner trim can only be used with Borg Warner valves, and so on. (There are many more valve/trim manufacturers than the three named.)

The incompatibility problem is especially acute in two situations. In the first incompatibility situation, a decision is made (for whatever reason) to change the existing trim. For example, it may be necessary to replace the existing trim because it has broken. It may also be desirable to upgrade the existing trim to a different style during construction or remodeling, or to change the trim so that it matches the trim in another part of the house. Whatever the reason, it often happens that the particular new trim that is wanted is only available from one manufacturer, and that is not the manufacturer of the valve unit that is already in place. Hence, a decision must be made as to whether to chose another kind of trim, available from the same manufacturer who manufactured the existing valve unit, or whether to buy a complete new valve unit, including trim, to replace the old valve unit. Replacing the old valve unit, unfortunately, is usually not a trivial task. It often involves tearing into the wall where the old valve unit is located (especially when the valve unit is used with a tub or shower) and usually ends up being a very messy, time consuming, and expensive job, even for the most experienced plumbers or handymen. Unfortunately, replacing the old valve unit may be the only option available in those situations where the valve unit was installed many years earlier and the valve manufacturer is no longer in business, or there is no acceptable compatible trim available in the market place.

In order to solve the problem created by this first situation (of wanting to change the trim), it is known in the art to provide universal trim that allegedly "fits all" stems. Unfortunately, the mechanism used to accomplish this universal fitting arrangement involves the use of set screws that engage the existing spline at various points around the circumference of the spline. Alternatively, a single set screw is used to engage the spline and stationary teeth on the opposite side of the spline from the set screw are pressed into engagement with the spline as the set screw is tightened. In either embodiment, because only a limited number of contacts are made with the spline by the set screws or stationary teeth, and because the stem and splines are typically made of brass (a relatively soft metal that is used for it anticorrosive properties), it is usually only a matter of time, after successive tightenings, before the set scres or stationary teeth have sufficiently chewed up the spline so that the second incompatibility problem, as described below, exists (broken or unusable spline). Further, the need to use set screws that radially engage the spline or stem as they are tightened requires that access to these screws be provided. This usually requires that unsightly access holes be included in the trim.

In the second incompatibility situation, the valve stem breaks, thereby providing no spline to which any trim can be attached. In this second situation, the only alternative known in the art is to replace at least the valve stem. Unfortunately, as seems to happen more often than not, the valve unit is an older unit whose manufacturer has since gone out of business, or who no longer makes replacement parts for the particular valve unit needing its stem replaced, meaning that no replacement valve stem is available. Hence, the entire valve unit must be replaced, which can be a very messy and expensive job, as indicated above.

SUMMARY OF THE INVENTION

The present invention is directed to a method and system that resolves the incompatibility problem that exists between the various plumbing valve and trim manufacturers. More specifically, it is an object of the present invention to provide a means whereby a given manufacturer of trim can provide compatibility between the valve stems of any manufacturer, including a broken valve stem with no spline or one having a damaged spline, and the trim provided by that given manufacturer.

It is a further object of the invention to provide a means whereby any desired trim can be adapted to fit any existing valve stem.

The invention is realized through the use of a means for milling a spindle on, or drilling an axial hole in, the existing valve stem; a special adaptor that slips over or fits into this modified stem; and a means for securing the special adaptor to the stem so that torsional forces applied to one are transferred to the other.

The special adaptor includes, at its unconnected end, a spline that matches or mates with the keyway of the particular trim (handle) that is to be used. The other end of the special adaptor has either an axial (longitudinal) hole therein, or a machined spindle protruding therefrom, depending on the type of modification made to the stem. If the stem has a spindle milled thereon, this spindle is inserted into an axial hole of a first type of adaptor. If the stem has an axial hole machined thererin, a prodtruding spindle from a second type of adaptor is inserted thereinto. In either case, once the stem and adaptor have been appropriately joined by inserting a spindle in an axial hole, the special adaptor is secured to the stem by means of a suitable bonding or securing technique. After the special adaptor has been secured to the stem, the trim is attached in conventional manner.

An important feature of the invention is the ease with which the splindle or axial hole can be machined on the valve stem by even the most unskilled plumbers or do-it-yourselfers. (Hereinafter, the term "machined" may be used to indicate either milling or drilling.) The valve stem is removed in conventional manner (as is done to replace a faucet washer) and secured in a suitable vice or other holding tool. When necessary, the length of the stem is cut down to a specified length. If a spindle is to be milled on the stem, a first type of special centering tool is slipped over the end of the remaining length of stem. A customized hollow mill is fitted in the chuck of a conventional power hand drill or equivalent tool. The customized hollow mill engages the centering tool as it is rotated by the power drill, thereby milling the splindle on the valve stem in coaxial alignment with the longitudinal axis of the stem. A first type of special adaptor, preferably provided as part of an adaptor kit that includes the first type of centering tool and customized hollow mill, is then slipped over the splindle. Using predrilled radial holes in the adaptor as a guide, one or more transverse holes are then drilled through the spindle. A pin, also included in the adaptor kit, is then inserted into each transverse hole so as to engage both the special adaptor and the spindle, thereby assuring a non-slip engagement between the special adaptor and the spindle.

If an axial hole is to be machined into the end of the stem, a similar technique is followed using a second type of centering tool and second type of adaptor. This second type of centering tool guides a drill, driven by a hand-held power tool, so that the resulting hole axis is aligned with the longitudinal axis of the stem. If needed, a reamer, or equivalent tool, can then be used to preccisely machine the hole diameter to a specified size that tightly fits with a machined spindle of the second type of adaptor.

As indicated, in a preferred embodiment, it is anticipated that the centering tool, hollow mill, a supply of special adaptors, a supply of rolling pins, and the needed drill for making the transverse holes, will all be conveniently provided in a single adaptor kit. The special adaptors included in the kit can either all be made for use with a particular manufacturer's trim, or for use with several different types of trim, in which case a variety of special adaptors can be included in the kit, with a group of special adaptors provided for each type of trim that will likely be used. Once such a kit has been obtained by a plumber or other individual, all that need be procured thereafter is the desired trim, which is readily availabe at most plumbing supply facilities. Additional roller pins and special adaptors can also be made available once the initial supply has been depleted. Such additional pins and adptors can be conveniently provided in a refill kit that supplements the initial kit. New or resharpened hollow mills and drills can also be made available as required.

As is evident from the above description of the means for adapting plumbing valve stems to a desired trim, the method of the invention comprises two main steps: (1) machining a spindle on or an axial hole in the end of the existing valve stem, and (2) securely connecting a special adaptor to the machined stem so that torsional forces applied to the adaptor are efficiently transferred to the stem without slippage of either component. Machining the splindle on or the axial hole in the stem is carried out as descirbed above using the special centering tool and the customized hollow mill or drill driven by a power hand tool, such as an electric drill. Connecting the appropriate adaptor to the machcined spindle is also accomplished as described above, namely: (1) drilling a transverse hole that passes through both an end of the adaptor and the stem, and (2) inserting a suitable pin, such as a metal rolled pin, into this hole.

BRIEF DESCRIPTION OF THE DRAWINGS

The above and other objects, features and advantages of the invention will be more apparent from the following more particular description thereof presented in conjunction with the following drawings, wherein.

DETAILED DESCRIPTION OF THE INVENTION

The following description is of the best presently contemplated mode of carrying out the invention. This description is not to be taken in a limiting sense but is made merely for the purpose of describing the general principles of the invention. The scope of the invention should be determined with reference to the appended claims.

The present invention is best understood with reference to the drawings wherein like parts are designated by the same reference numerals throughout.

Figure 1:
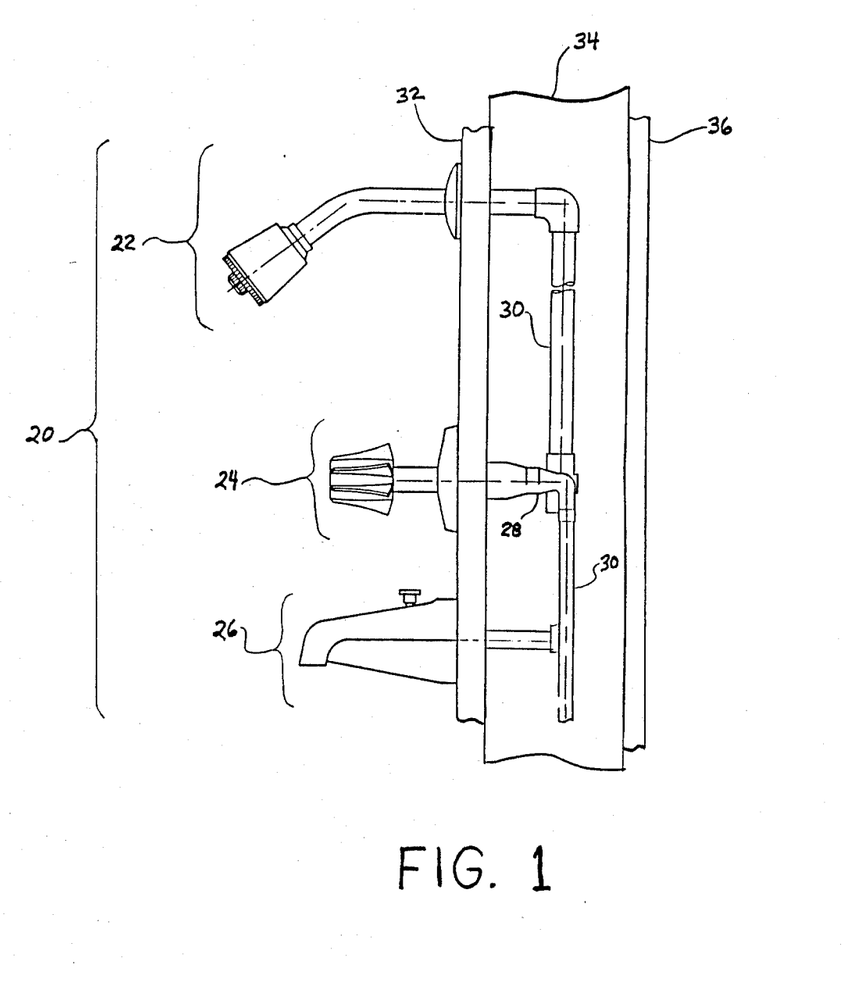
FIG. 1 is a partial side view of the plumbing fixtures associated with a tub/shower combination, and shows both the pipes and valve unit inside the wall, and the trim exterior to the wall.

Referring first to FIG. 1, there is shown a partial side view of the plumbing fixtures that are commonly associated with a shower/tub combination. Included in FIG. 1 is the external plumbing trim 20 that is visible and accessible to a user from inside of the bathroom where the tub/shower are located. This trim 20 includes a shower head 22, valve trim 24, and spout trim 26. As indicated above, the present invention is concerned with adapting the valve trim 24, and more particularly the handle 25, to an existing valve unit 28 that is behind the wall 32.

As can be appreciated from FIG. 1, the plumbing pipes 30 are located within the wall bounded by the shower/tub wall 32, which usually includes ceramic tile, fiberglass sheets, or some other waterproof coating, and the back wallbaord (typically drywall) 36. Wall studs 34, typically spaced every sixteen inches within the wall, provide the primary support for the wall. Once the pipes 30 and valve unit 28 are installed within the wall, and the wallboards 36 and 32, including any tile or other waterproof coating, are added thereto, it is extremely difficult to gain access to the valve unit 28 or the pipes 30. Thus, an important feature of the present invention is the ability to allow the trim 25 to be changed without having to replace the valve unit 28, which replacement would entail knocking a hole in either the bathroom wall 32 or the backwall 36. Neither of these alternatives (of knocking a hole in the wall from either side) can be easily and inexpensively done.

Figure 2:
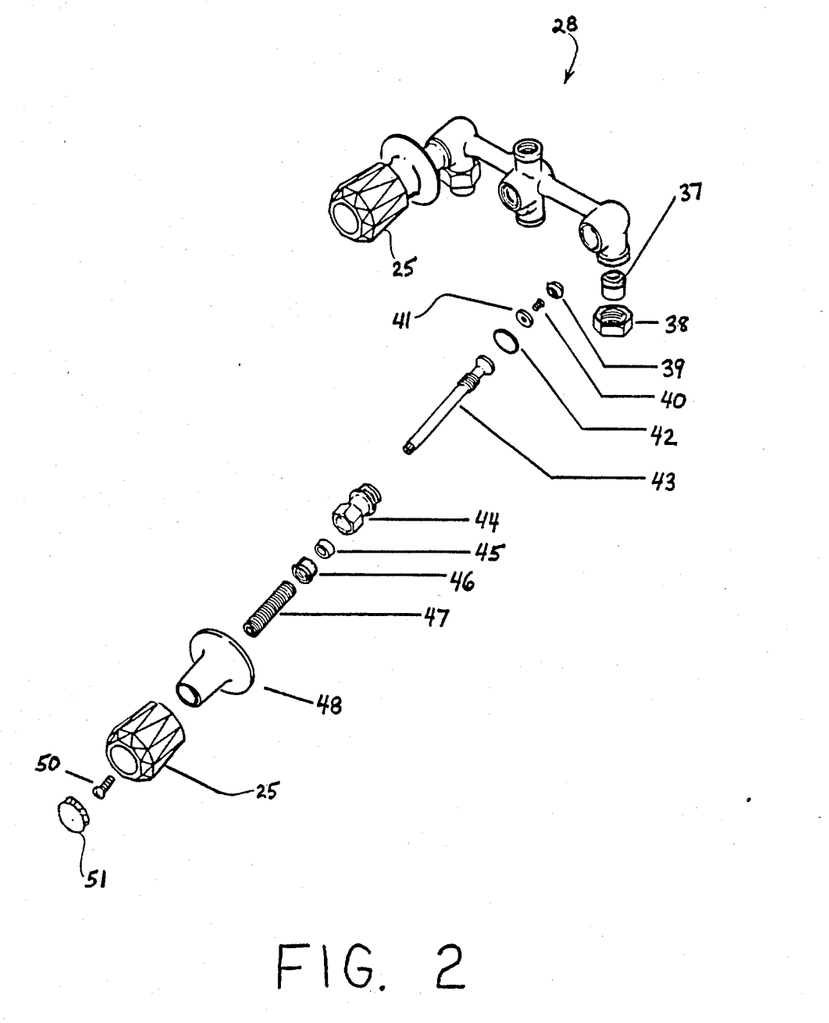
FIG. 2 is an exploded view of the valve unit and its components parts, including the trim.

Referring next to FIG. 2, there is shown an exploded view of the valve unit 28. While the detailed construction of a given manufacturer's valve unit may differ somewhat from what is shown in FIG. 2, it is believed that the exploded view of FIG. 2 shows the main components associated with most valve units.

Referring then to FIG. 2, a pipe adaptor 37 and nut 38 are used to connect the pipe 30 to the valve unit. A valve seat 39 is positioned inside the valve unit 28 and provides the surface against which the valve washer 41, held to the end of the valve stem 43 by screw 40, acts as the valve is opened and closed. Ring washer 42 slides over the valve stem 43 and prevents water from leaking around the stem 43. Bonnet 44, having packing 45 held in place with packing nut 46, provides a channel through which the valve stem 43 is inserted. Threads (not shown) internal to the bonnet 44 engage the threads of the stem 43 in order to allow the stem 43 to axially move as the stem is rotated. Nipple 47 (not used on all types of valve units) also provides a means to which a flange 48 may be secured. The handle 25, as will be explained below, lockingly engages the tip or spline of the stem 43 so that rotation of the handle 25 causes the valve stem 43 to rotate. The engagement between the stem 43 and handle 25 is secured with screw 50. That is, screw 50 prevents the handle 25 from axially slipping off the end of the stem 43. Screw 50 does not transfer the torque from the handle 24 to the stem 43. This torque is transferred through the groves or keys of the spline at the end of the stem 43 as they become lockingly engaged with matching groves or keyways on the inside of the handle 25, as more fully explained below in conjunction with FIGS. 3–5. Finally, a cap 51 snaps into the end of the handle 25 in order to conceal the screw 50. Typically, the cap 51 will also include a letter designation thereon to indicate whether that particular handle is for the cold or hot water valve.

Figure 3:
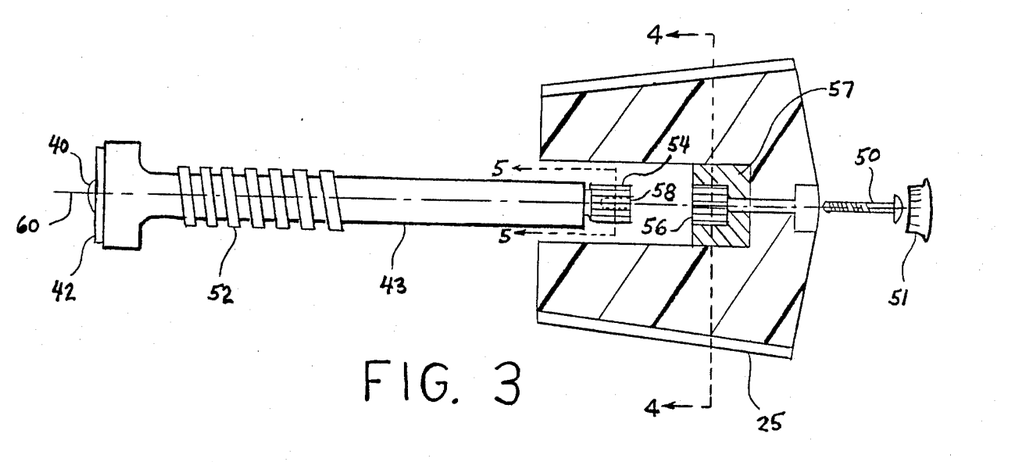
FIG. 3 is a side view of the valve stem, and includes a sectional side veiw of the trim that is used therewith.
Figure 4:
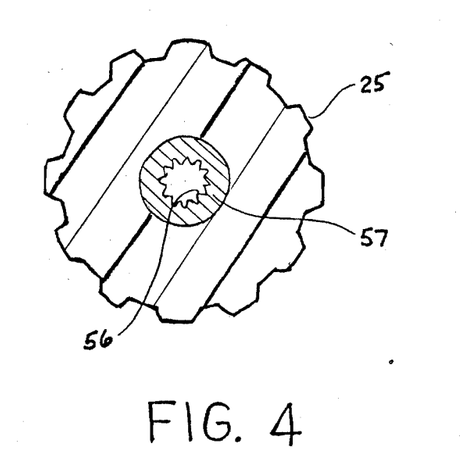
FIG. 4 is a sectional view taken along the line 4—4 of FIG. 3, and illustrates one type of keyway that forms an integral part of the trim.
Figure 5:
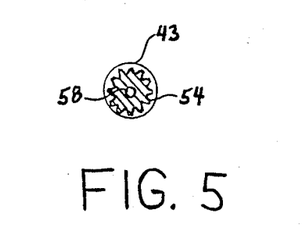
FIG. 5 is a sectional view taken along the line 5—5 of FIG. 3, and illustrates one type of key or pattern used on the spline to mate with the keyway of the trim of FIG. 4.

Referring next to FIGS. 3–5, the details of how the handle trim 25 engages the stem 43 are illustrated. In FIG. 3, a side view of the valve stem 43 is shown in conjunction with a sectional view of the trim 25. At one end of the stem 43 the valve washer 42 can be seen as secured to the stem 43 by screw 40. This is the "washer" that most homeowners or other do-it-yourselfers have replaced from time to time in order to repair a leaky faucet. Also shown in FIG. 3 are the threads 52 that engage corresponding threads on the inside of the bonnet 44 (FIG. 2). At the opposite end of the stem 43 is a spline 54. A sectional view of the spline 54 is shown in FIG. 5 as taken along the line 5—5 in FIG. 3. As seen from these figures, 54 comprises a pattern of groves or channels separated by peaks or ridges positioned around the circumference of the spline. A threaded hole 58 is positioned in the center of the spline 54 as viewed in the sectional drawing of FIG. 5. The handle or trim 25 is also shown in FIG. 3, in axial alignment with the longitudinal axis 60 of the stem 43. The trim 25 includes on the inside thereof a keyway block 57 in which a keyway 56 has been prepared in order to lockingly engage the spline 54 of the stem 43. The groves of the keyway 56 match the ridges of the spline 54 in a way that lockingly engages rotation of the handle 25 to rotation of the spline and stem 43. As indicated previously, a screw 50, passing through an axial hole 53 in the handle 25, is screwed into the threaded hole 58 of the stem 43, thereby preventing the trim 25 from becoming axially disengaged from the stem 43. The cap 51 is snapped into place over the head of the screw 50.

Figure 6:
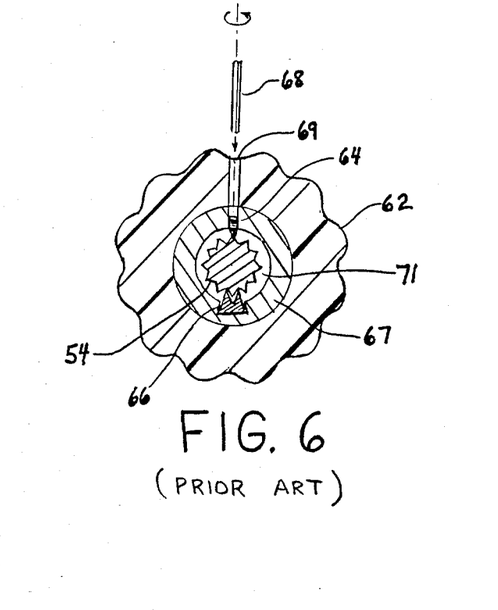
FIG. 6 is a sectional view illustrating one type of prior art trim device that is designed to fit all types of splines.

Referring next to FIG. 6, there is shown a sectional view of a prior art approach for lockingly engaging a handle 62 to the spline 54 of a valve stem 43. In accordance with this prior art approach, the handle 62 includes at least one set screw 64 that is accessed through radial hole 69 with, for example, an allen wrench 68. A hole 71 in the center of a holding block 67 is made larger in diameter than the largest diameter spline with which the universal "fits all" handle 62 will be used. On the opposite side of the holding block 67 from the set screw 64 one or more stationary teeth 66 are secured to the holding block 67. Hence, as the set screw 64 is tightened (turned so as to move towards the spline 54), both the tip of the set screw 64 and the tips of the teeth 66 engaging the spline 54, thereby lockingly engaging rotation of the handle 62 to rotation of the spline 54. Unfortunately, because all the torsional forces are transfered from the handle 62 to the spline 54 on only one or two points, and further because the spline 54 is typically made of brass (a relatively soft metal), it is usually only a matter of time before the set screw 64 and the teeth 66 chew up the spline 54 to the point that it is difficult to maintain a locked relationship therewith. Further, as can be appreciated from FIG. 6, the use of any set screw requires an access hole 69. Such an access hole is difficult to conceal, and the existance of such hole may therefore detract from the attractiveness of the handle 62.

Figure 7:
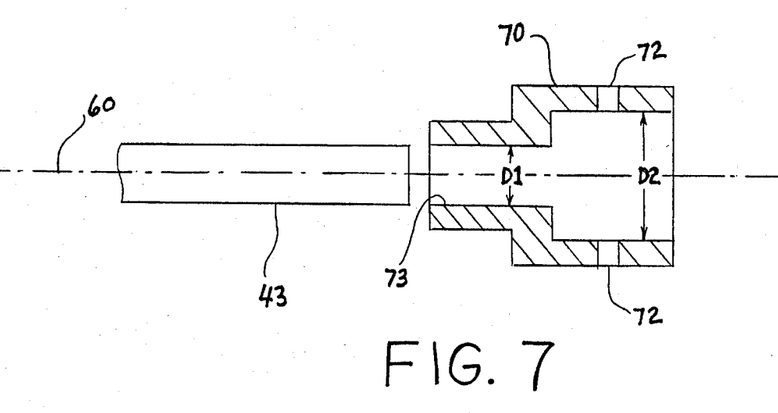
FIG. 7 shows a side view of a cut-off or broken valve stem, and also includes a sectional view of a special centering tool, in axial alignment with the valve stem, the centering tool comprising a key component used in milling a spindle on the stem in accordance with the adapting system of the present invention.

Referring next to FIG. 7, the means for adapting plumbing valve stems to desired trim of the present invention will be explained. FIG. 7 shows a side view of a broken or cut-off valve stem in conjunction with a sectional view of a special centering tool 70. The centering tool 70 comprises a key component, as is explained hereinafter, to enable the milling of a spindle on the valve stem. The centering tool 70 is shown in FIG. 7 in axial alignment with the longitudinal axis 60 of the valve stem 43. (It is noted that only one end of the stem 43 is shown in FIG. 7, as is the case for the figures that follow FIG. 7, the threads 52 not being shown. The spline previously existing on the stem 43 has either been broken or cut off.)

The centering tool 70 has an axial stair-step bore 73 therethrough. A first portion of this axial bore 73 has a diameter D1, and a second portion has a diameter D2. Diameter D1 is sized to be just slightly larger than the outside diameter of the stem 43, thereby allowing the tool 70 to be slid over the stem 43 while maintaining coaxial alignment therewith, as indicated in FIG. 8.

Figure 8:
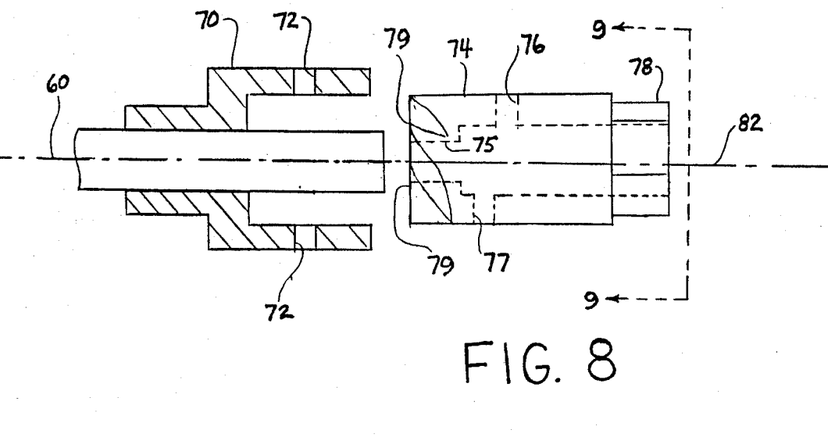
FIG. 8 is a side view as in FIG. 7 with the centering tool slide over the valve stem, and further shows a customized hollow mill in axial alignment with the stem, the hollow mill also comprising a key component used in milling a spindle on the stem in accordance with the adapting system of the present invention.

Referring next to FIG. 8, the centering tool 70 is shown in sectional view as it is slid over the stem 43. A hollow mill 74, customized as described below, is then used to mill a spindle 92 on the end of the stem 43. Advantageously, the hollow mill 74 has an outer diameter that is just slightly less than the diameter D2 of the central bore 73 of the centering tool 70. Hence, as is shown best in FIG. 12, as the hollow mill engages the stem 43 for the purpose of milling a spindle thereon, the centering tool 70 maintains the milling axis 82 of the hollow mill 74 in coaxial alignment with the longitudinal axis 60 of the stem 43.

The hollow mill 74 is of conventional design with the exception of circumferential hex drive 78 that is machined on a rear end thereof. A stair-stepped bore passes longitudinally through the mill 74. A first portion 75 of this bore has a diameter equal to the diameter of the spindle that is to be milled. Cutting blades 79 are on a front end of the mill 74 and it is these blades that perform the milling or cutting function in order to mill away the unwanted portions of the stem 43. Radial holes 76 and 77 are positioned within the hollow mill 74 in order to provide a way for the milled material to be expelled from the device as it is rotated. (It is noted that most of this milled material is lifted by the blades 79 to the outside of the mill, rather than passing to the center bore of the mill.) Escapement holes 72 in the centering tool 70 allow the milled material to be expelled from the working area.

Figure 9:
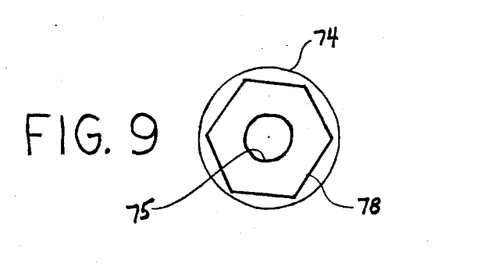
FIG. 9 is an end view of the customized hollow mill of FIG. 8, and illustrates a circumferential hex drive that allows the hollow mill to be engaged and rotated.

As indicated in the end view of FIG. 9, the preferred manner of driving the mill 74 is to engage the circumferential hex drive 78 that is machined on the non-cutting end thereof. This allows the torsional forces that are needed to rotate the hollow mill 74 to be applied near its circumference, thereby improving the amount of torque that can be developed for a given amount of force.

Figure 10:
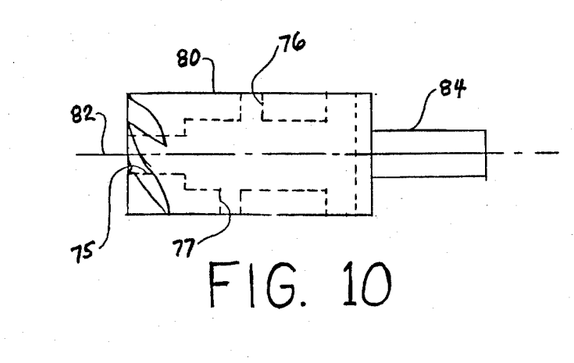
FIG. 10 is a side view of an alternative embodiment of the hollow mill that incorporates a smaller drive shaft.
Figure 11:
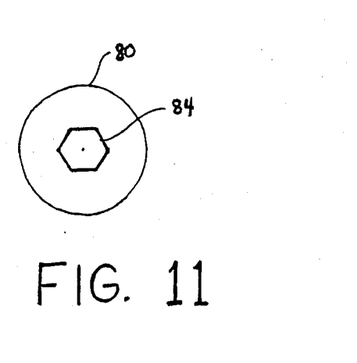
FIG. 11 is an end view of the hollow mill of FIG. 10.

Alternatively, a different embodiment of the customized hollow mill can be used as shown in FIG. 10. In accordance with this alternative embodiment, a hollow mill 80 is provided that includes a smaller diameter drive shaft 84 at the rear end thereof. This smaller drive shaft 84 is sized to fit in the chuck of a ⅜ or ¼ inch electric drill, thereby facilitating the coupling of the hollow mill 80 to the electric drill.

Figure 12:
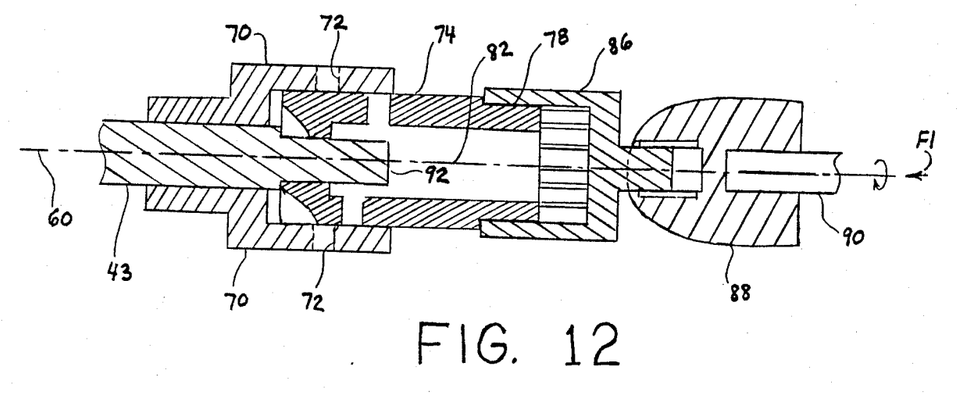
FIG. 12 is a sectional view illustrating the milling of the splindle on the valve stem through the use of the centering tool, the hollow mill, a socket wrench, and a rotating chuck of a hand-held power tool.

Referring next to FIG. 12, a sectional view is shown that illustrates the stem 43 as a spindle 92 is milled thereon. This is accomplished through the use of the centering tool 70, the hollow mill 74, a socket wrench 86 (used to engage the circumferential hex drive 78 of the hollow mill 74), and a chuck 88 of a power-driven rotating shaft 90. The power-driven rotating shaft 90 may be a shaft of an electric hand-held drill, or equivalent hand-held power tool. The chuck 88 can readily engage the drive shaft of a conventional socket wrench 86, which socket wrench is sized to fit the hex drive 78 of the customized hollow mill 74. In the preferred embodiment, the hex drive 78 of the hollow mill is the equivalent of a conventional ⅝ inch hex nut, thereby allowing a conventional ⅝ inch socket wrench to be used to engage therewith. Advantageously, the use of the centering tool 70 assures that the milling axis 82 of the hollow mill 74 is aligned with the longitudinal axis 60 of the stem 43 as the milling operation is performed. The diameter of the valve stem 43 will typically be between 0.250 and 0.500 inches. In the preferred embodiment, the diameter of the spindle that is milled thereon in accordance with the teachings of the invention is 9/32 inches.

In operation, the spindle 92 can be easily milled on the end of stem 43 as follows. With the stem rotated so that the valve is in its closed position, a reference mark is made on the stem at the point where the stem is flush with the wall. Next, the stem 43 is removed from the valve unit 28 in conventional manner. The stem 32 is secured in a suitable vice or other holding tool, and the stem is cut off at the reference mark. Next, the appropriate centering tool (having the correct diameter D1 to just fit over the diameter of the stem 43) is slid over the stem. The hollow mill 74 is engaged with the chuck of a handheld power tool, such as an electric drill, through the use of a socket wrench 86, if needed. The mill 74 is then engaged with the centering tool 70 as the power tool rotates the hollow mill 74, thereby milling the spindle on the stem 43. The user of the hand-held power tool applies a manual axial force F1 as needed in order to control the milling of the spindle 92. The power tool supplies the torsional forces needed to cut or mill the stem 43.

Figure 13:
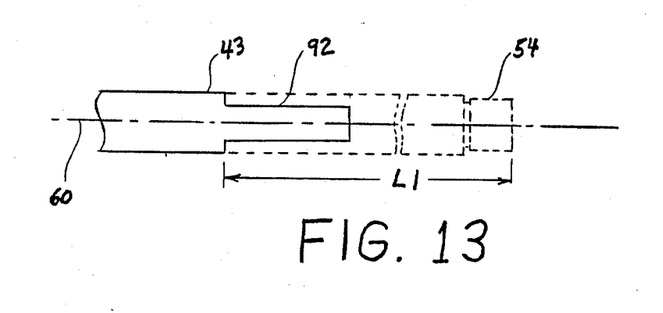
FIG. 13 is a side view of the valve stem after the spindle has been milled thereon, and also shows, in phantom, that portion of the original valve stem that has been removed.

Referring to FIG. 13, a side view of the end of the stem 43 with the spindle 92 milled thereon is illustrated. Also shown in FIG. 13, in phantom (dashed lines), is that portion of the original stem 43, including the spline 54, that has been milled away in making the spindle 92. It is noted that the shoulder where the spindle 92 joins the body of the stem 43 is at a distance L1 from the original length of the stem 43. As will be seen hereinafter, this shortening of the stem 43 is necessary in order to eventually position the new trim 108 (FIG. 17) at an appropriate axial distance from the washer end of the stem 43 (i.e., at an appropriate distance from the wall).

Figure 14:
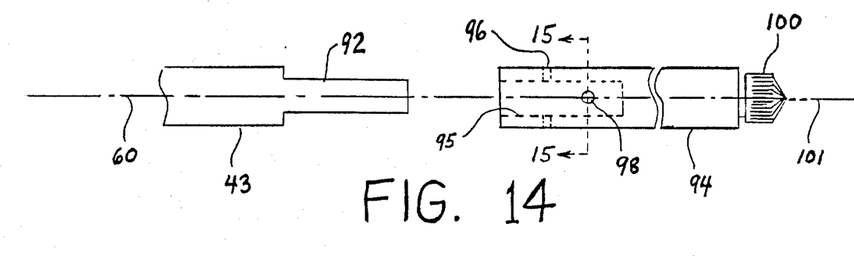
FIG. 14 is a side view of the milled stem of FIG. 13 with a special adaptor in axial alignment therewith, the special adaptor forming an important element of the present invention.
Figure 15:
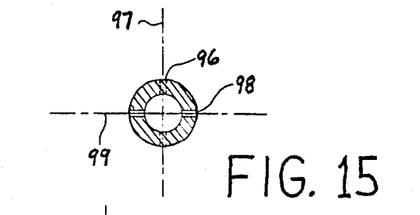
FIG. 15 is a sectional view taken along the line 15—15 of the adaptor of FIG. 14.

Referring next to FIG. 14, a side veiw of the milled spindle 92 on the stem 43 is shown in axial alignment with a special adaptor 94. The adaptor is made from a rod having substantially the same diameter as the diameter of the stem 43. The adaptor 94 further has an axial receiving hole or bore 95 at a first end thereof that is sized to allow the spindle 92 to be tightly inserted thereinto. That is, the diameter of the hole 95 is only slightly larger than the outside diameter of the spindle 92, and the depth of the hole 95 is at least as long as the length of the spindle 92. Transverse or radial holes 96 and 98 (i.e., holes having an axis that is perpendicular to the longitudinal axis 101 of the adaptor 94) pass through the walls of the adaptor as shown in FIGS. 14 and 14. In the preferred embodiment, the hole 96 is axially spaced-apart from the hole 98, and the hole 96 has an axis 97 that is more or less orthogonal with resepct to the axis 99 of hole 98. The adaptor 94 further has a spline 100 at the end thereof opposite the axial hole 95. This spline 100 is of a type and design adapted to mate or match with the corresponding keyway 106 of the new trim 108 (FIG. 17) that is to be used with the valve unit 28.

Figure 17:
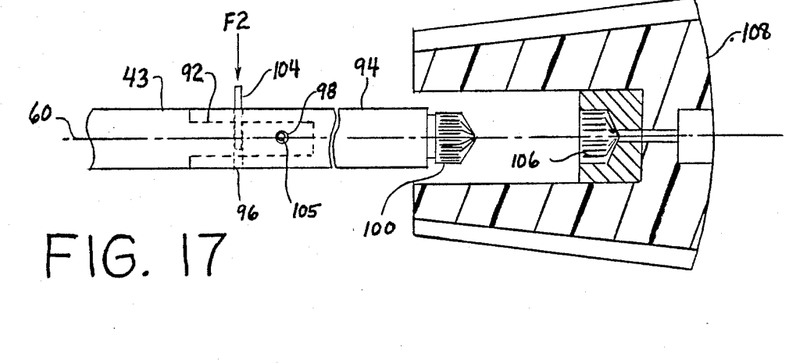
FIG. 17 shows the milled stem engaged with the adaptor, as in FIG. 16, and further shows the insertion of rolling pins into the transverse holes in order to lockably engage rotation of the adapter to rotation of the stem, and also shows, in axial alignment with the stem/adaptor combination, the new trim that is fitted to the spline of the adaptor.

The adaptor 94 has an approximate length L2. This length L2 is selected to position the new spline 100 at an appropriate distance from the wall 32 (see FIG. 1) so that the new trim 108 can function properly without hitting the wall or other trim. As indicated previously, the original stem 43 was cut off at a reference point that was flush with the wall. Hence, the length L2 is selected so that the new trim 108 will be positioned at an appropriate distance from the wall as determined from this reference point. Advantageously, this distance L2 will be a fixed distance for a given type of new trim 108.

Figure 16:
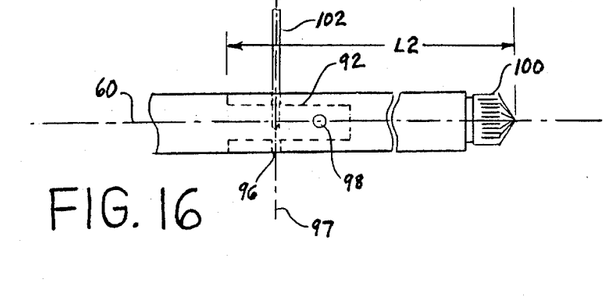
FIG. 16 is a side view of the milled stem with the adaptor slid over the spindle, and illustrates the use of a drill to drill a hole transversley through the spindle in alignment with a transverse hole pre-drilled in the adaptor.

Once the adaptor 94 has been slid over the spindle 92, as shown in FIG. 16, a drill 102 is used to drill transverse holes through the spindle 92 that are aligned with the pre-drilled holes 96 and 98 in the adaptor 94. Advandtagously, these pre-drilled holes 96 and 98 serve as a drill guide for the drilling of the transverse holes through the spindle 92. This allows these spindle holes to be quickly and accurately drilled in alignment with the pre-drilled holes 96 and 98.

With the holes 96 and 98 passing through both the adaptor 94 and the spindle 92, rolling pins 104 and 105 are inserted into the holes 96 and 98, respectively, through the application of a tapping force F2, as indicated in FIG. 17. These pins 104 and 105 thereby efficiently transfer the torsional forces applied to the adaptor 94 to the stem 43, and prevent the adaptor 94 from slipping with respect to the stem 43.

Other suitable securing means could be used to lock rotation of the adaptor 94 to the stem 43 besides (or in addition to) the pins inserted into transverse holes as described above. For example, a suitable bonding agent, such as a high strength epoxy, could be evenly spread over the spindle 92 and the inside of the bore 95. This bonding agent would then securely bond or glue the stem 43 to the adaptor 92. Further, the axial receiving hole 95 in the adaptor 94 could have a keyway associated therewith, such as a flat surface along one side thereof, thereby requiring that the stem 92 have a corresponding flat surface filed thereon prior to inserting the spindle into the adaptor.

Figure 18A:
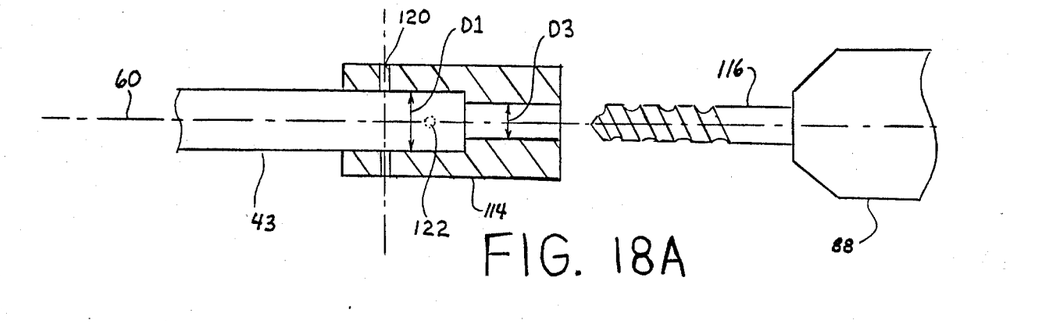
FIG. 18A is a sectional view of an alternative embodiment of the centering tool as it is slid over the valve stem.
Figure 18B:
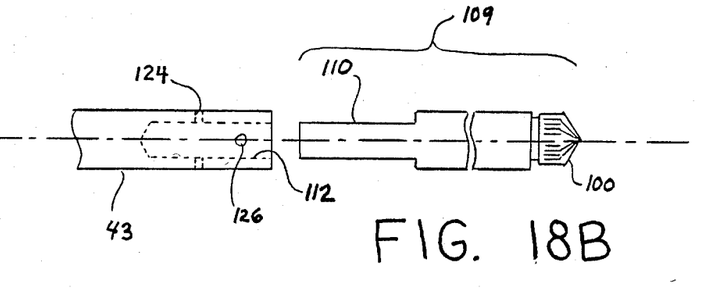
FIG. 18B is a side view of the stem after an axial hole has been drilled therein using the centering tool of FIG. 18A, and also shows an alternative embodiment of the special adaptor that is used therewith.

It would also be possible, as shown in FIGS. 18A and 18B, to provide a second type of adaptor 109 having a spindle 110 premilled thereon for insertion into a receiving axial hole 112 in the end of the stem 43. The hole 112 is drilled in alignment with the longitudinal axis 60 of the stem 43 using an alternative embodiment of the special centering tool 114, as shown in FIG. 18A. This centering tool 114 aligns a drill 116 with the stem axis 60 by receiving the drill in hole 118 having a diameter D3 that matches the diameter of the drill 116. After the hole 112 is drilled, it is preferably machined to a precise diameter using a reamer or equivalent tool. This precise diameter tightly matches the machined spindle 110 of the second type of adpator 109. The centering tool 114 may also have pre-drilled transverse holes 120 and 122 therein that serve as drill guides for drilling transverse holes 124, 126 through the stem 43, which holes 124, 126 may in turn serve as drill guides for drilling aligned holes through the spindle 110 of the adaptor 109. Pins or other suitable securing means could then be used as described above to lockingly engage the adaptor 109 to the stem 43.

Once the adaptor 94 (or the adaptor 109) has thus been secured to the stem 43, the new trim 108 can be engaged with the new spline 100 in conventional manner, and the desired objective of adapting the new trim 108 to the existing valve stem 43 has been realized. Advantageously, the entire adapting operation can be performed in less than five minutes per stem once the stem has been removed from the valve unit, and typically only about two minutes of this time is required to mill the spindle 92 on the stem and drill the tranverse rolling-pin holes therethrough. This time is contrasted to the many hours (and sometimes even days) that would be required to replace the valve unit 28, which replacement has often been the only alternative heretofore available if a particular trim not matching the existing spline was to be used.

As indicated previously, it is contemplated that all of the components needed in order to practice the present invention will be provided in an adaptor kit. Included in this kit would be the centering tool 70, the hollow mill 74 (and/or the hollow mill 80), a supply of adaptors 94, and a supply of pins 104, 105. Also included in the kit could be the drill 102. More than one centering tool 70 could further be provided in the kit, each having a different diameter D1 (FIG. 7), to provide a range of diameters D1 that match the various valve stem diameters that commonly exist. In practice, only about three different valve stem diameters are commonly employed by the various manufacturers of valve units. Accordingly, a kit having three centering tools therein, one for each of the three commonly used stem sizes, could be provided.

Further, while it is contemplated that such a kit would include adaptors 94 therein for use with a particular manufacturer's trim, different sets of adaptors, each set being designed for use with a different manufacturer's trim, could also be provided.

Similar kits could be provided for the emobodiment shown in FIGS. 18A and 18B.

While the invention herein disclosed has been described by means of specific embodiments thereof, numerous modifications and variations could be made thereto by those skilled in the art without departing from the spirit and scope of the invention. It is therefore to be understood that within the scope of the appended claims, the invention may be practiced otherwise than as specifically described herein.

What is claimed is:

1. A method for adapting plumbing trim having a keyway of a first type with a stem of a plumbing valve, said stem having an end, which may or may not include a spline, that does not match the first type of keyway of the plumbing trim, said method comprising the steps of:
   (a) machining a first connection means on said stem; and
   (b) connecting an adaptor to said first connection means, said adaptor having a matching spline at a first end thereof that matches the keyway of the first type of said plumbing trim, and said adaptor further having a second connection means at a second end thereof that connects with the first connection means machined on said stem; and
   (c) joining the keyway of the plumbing trim with the matching spline at the first end of said adaptor.

2. The method of claim 1 wherein step (a) comprises:
   (1) placing a centering tool over said stem, said centering tool having an alignment axis that is substantially coaxial with a longitudinal axis of said stem when said centering tool is placed over said stem,
   (2) attaching a hollow mill to a rotatable shaft, the centering tool having means for aligning a milling axis of said hollow mill with the alignment axis of said centering tool, said hollow mill having cutting means thereon for milling a spindle on the end of said stem,
   (3) engaging said hollow mill with said centering tool,
   (4) rotating the shaft to which the hollow mill is attached,
   (5) applying an axial force to the hollow mill along its milling axis concurrently with the rotating of the shaft to which the hollow mill is attached, thereby milling a spindle on said stem, said spindle comprising said first connection means, and
   (6) removing said hollow mill from said centering tool, and removing said centering tool from said stem.

3. The method of claim 2 wherein the rotatable shaft to which the hollow mill is attached comprises a chuck of a hand-held power tool.

4. The method of claim 2 wherein the second connection means of the adaptor for connecting the second end of the adaptor to the spindle includes a longitudinal hole in the second end of the adaptor into which the spindle of said stem may be inserted and wherein step (b) comprises:
   (1) inserting the spindle of said stem into the hole of said adaptor,
   (2) drilling at least one transverse hole through said adaptor and said spindle near the first end of said adaptor, said transverse hole having a drilling axis that is substantially perpendicular to the longitudinal axis of said stem, and
   (3) inserting a pin into said transverse hole.

5. The method of claim 2 wherein the means of the adaptor for connecting the second end of the adaptor to the spindle includes a longitudinal hole in the second end of the adaptor into which the spindle of said stem may be inserted and wherein step (b) comprises:
   (1) inserting the spindle of said stem into the hole of said adaptor,
   (2) drilling at least two spaced-apart transverse holes through said adaptor and said spindle near the first end of said adaptor, said transverse holes having respective drilling axes that are substantially perpendicular to the longitudinal axis of said stem and substantially orthogonal with respect to each other, and
   (3) inserting respective pins into each of said transverse holes.

6. The method of claim 2 wherein the means of the adaptor for connecting the second end of the adaptor to the spindle includes a longitudinal hole in the second end of the adaptor into which the spindle of said stem may be inserted and wherein step (b) comprises:
   (1) inserting a suitable bonding agent into said longitudinal hole of said adaptor and on said spindle of said stem, and
   (2) inserting the spindle of said stem into the hole of said adaptor.

7. The method of claim 1 wherein step (a) comprises:
   (1) placing a centering tool over said stem, said centering tool having an alignment axis that is substantially coaxial with a longitudinal axis of said stem when said centering tool is placed over said stem,
   (2) attaching a drill to a rotatable shaft, the centering tool having means for aligning a drilling axis of said drill with the alignment axis of said centering tool, said drill having cutting means thereon for drilling an axial hole in the end of said stem,
   (3) engaging said drill with said centering tool,
   (4) rotating the shaft to which the drill is attached,
   (5) applying an axial force to the drill along its drilling axis concurrently with the rotating of the shaft to which the drill is attached, thereby drilling an axial hole in said stem, said axial hole comprising said first connection means, and
   (6) removing said drill from said centering tool, and removing said centering tool from said stem.

8. The method of claim 7 wherein step (a) further comprises reaming said axial hole to a precise diameter.

9. The method of claim 7 wherein the second connection means of the adaptor for connecting the second end of the adaptor to the axial hole of the stem includes a spindle on the second end of the adaptor, and wherein step (b) comprises:
   (1) inserting the spindle of said adaptor into the axial hole of said stem,
   (2) drilling at least one transverse hole through said stem and said spindle, said transverse hole having a drilling axis that is substantially perpendicular to the longitudinal axis of said stem, and
   (3) inserting a pin into said transverse hole.

10. A conversion kit for adapting plumbing trim having a specific keyway with a stem of a plumbing valve having a spline or other end that does not match the specific keyway of the plumbing trim comprising:

a centering tool for placement over said stem, said centering tool having an alignment axis that is substantially coaxial with a longitudinal axis of said stem whenever said centering tool is positioned over said stem;

a hollow mill having cutting means thereon for milling a spindle having a diameter smaller than the diameter of said stem, said centering tool having means therein for aligning a milling axis of said hollow mill with the alignment axis of said centering tool whenever said hollow mill engages said centering tool, said hollow mill including coupling means on one end thereof for allowing detachable engagement with a rotatable chuck of a power-driven hand tool, whereby said hollow mill, when attached to a rotating chuck of said power-driven hand tool, can be engaged with the centering tool placed over said stem in order to mill a spindle on said stem;

an adaptor, said adaptor comprising a length of rod having a diameter substantially the same as said stem, said adaptor having connecting means at a first end thereof for securely connecting its first end to the spindle of said stem, said adaptor further having a spline at a second end thereof that matches the specific keyway of the plumbing trim to be used.

11. The conversion kit of claim 10 wherein the connecting means of said adaptor comprises:

a hole drilled along a longitudinal axis of said rod to a depth that is at least as long as the spindle that is milled on said stem, and that has a diameter that is slightly larger than the spindle of said stem, whereby the first end of said adaptor may be slipped over said spindle; and means for securely attaching the first end of said adaptor to the spindle of said stem so that a torsional force applied to said adaptor is transferred to said stem without slippage between said adaptor and said stem.

12. The conversion kit of claim 11 wherein said attaching means for securely attaching the first end of said adaptor to the spindle of said stem comprises:

means for drilling at least one transverse hole through said spindle in alignment with at least one radial hole in said adaptor; and a pin for insertion into said radial hole and said transverse hole.

13. The conversion kit of claim 11 wherein said attaching means for securely attaching the first end of said adaptor to the spindle of said stem comprises:

means for drilling at least two transverse holes through said spindle in alignment with respective radial holes in said adaptor; and respective pins for insertion into said radial holes and said transverse holes.

14. A conversion kit for adapting plumbing trim having a specific keyway with a stem of a plumbing valve having a spline or other end that does not match the specific keyway of the plumbing trim comprising:

a centering tool for placement over said stem, said centering tool having an alignment axis that is substantially coaxial with a longitudinal axis of said stem whenever said centering tool is positioned over said stem;

a drill having cutting means thereon for drilling a hole having a diameter smaller than the diameater of said stem, said centering tool having means therein for aligning a drilling axis of said drill with the alignment axis of said centering tool whenever said drill engages said centering tool, said drill including coupling means on one end thereof for allowing detachable engagement with a rotatable chuck of a power-driven hand tool, whereby said drill, when attached to a rotating chuck of said power-driven hand tool, can be engaged with the centering tool placed over said stem in order to drill an axial hole in said stem;

an adaptor, said adaptor comprising a length of rod having a diameter substantially the same as said stem, said adaptor having connecting means at a first end thereof for securely connecting its first end to the axial hole of said stem, said adaptor further having a spline at a second end thereof that matches the specific keyway of the plumbing trim to be used.

15. The conversion kit of claim 14 wherein the connecting means of said adaptor comprises:

a spindle machined along a longitudinal axis of said rod, said spindle having a diameter that is slightly less than the diameter of said axial hole of said stem, whereby the spindle of said adaptor may be tightly engaged with the axisl hole of said stem; and means for securely attaching the spindle of said adaptor to said stem so that a torsional force applied to said adaptor is transferred to said stem without slippage between said adaptor and said stem.

16. A system for adapting plumbing trim having a particular keyway as an integral part thereof, said particular keyway being designed for use with a matching spline of a plumbing valve stem of a compatable valve unit, with a stem of a plumbing valve having a non-matching spline or other end that does not match the particular keyway of the plumbing trim, said system comprising:

means for milling a spindle on the end of said stem;

an adaptor, said adaptor having a spline at a first end thereof that matches the particular keyway of the plumbing trim; and means for securely coupling a second end of the adaptor to the spindle of said stem.

17. The system of claim 16 wherein said means for milling a spindle on said stem comprises:

a centering tool adapted to be placed over said stem, said centering tool having an alignment means for aligning a milling axis of a milling tool with a longitudinal axis of said stem whenever said milling tool engages said centering tool;

a hollow mill having cutting means at a first end thereof for milling a spindle on said stem, said hollow mill further having coupling means at a second end thereof for allowing detachable engagement with a rotatable chuck of a hand-held tool;

means for rotating the chuck of said hand-held tool at the same time that said hollow mill is engaged with said centering tool placed over said stem.

18. The system of claim 17 wherein said alignment means of said centering tool comprises a hole passing longitudinally through said centering tool, said hole having a first diameter beginning at one end of said centering tool and continuing for a substantial distance of the length of said centering tool that is slightly larger than a diameter of said stem, whereby said centering tool can be slid over said stem, and said hole having a second diameter continuing for the remaining length of said centering tool that is slightly larger than the outside diameter of said hollow mill, whereby said hollow mill can be inserted into said second diameter hole at the same time that said centering tool is slid over said stem.

19. The system of claim 16 wherein the coupling means for securely attaching the second end of the adaptor to the spindle of said stem comprises
   a first hole drilled along a longitudinal axis of said adaptor, said first hole having a diameter that is slightly larger than said spindle and a depth that is at least as long as the length of said spindle, whereby the second end of said adaptor may be slipped over said spindle as said spindle is received in said first hole;.
   means for securely attaching the second end of said adaptor to the spindle of said stem so that a torsional force applied to said adaptor is transferred to said stem without slippage between said adaptor and said stem.

20. The system of claim 19 wherein said means for securely attaching the second end of the adaptor to said spindle comprises
   means for making at least one transverse hole through said spindle and said adaptor; and
   a pin for insertion into said transverse hole;
   whereby torsional forces applied to said adaptor are transferred to said stem through said pin.

21. The system of claim 19 wherein said means for securely attaching the second end of the adaptor to said spindle comprises:
   means for drilling at least two transverse holes through said spindle in alignment with respective radial holes pre-drilled in said adaptor; and
   respective pins for insertion into said radial holes and said transverse holes;
   whereby torsional forces applied to said adaptor are transferred to said stem through said pins.

22. In a plumbing valve unit having a valve stem with a first spline at its end that is adapted to mate with a matching first keyway of a particular type of plumbing trim, an adaptive system for allowing plumbing trim of a second type having a second keyway that does not match with the first spline of the valve stem to be used with said valve unit, said adaptive system comprising:
   means for milling a spindle at the end of said stem, said spindle having a diameter less than the diameter of said stem, said milling causing said first spline to be milled away; and
   a stem adaptor having a second spline at a first end thereof that matches the keyway of plumbing trim of the second type, and further having connection means at a second end thereof for firmly engaging said spindle so that any torsional forces applied to said stem adaptor are efficiently transferred to said stem, said connection means including
   a hole bored along a longitudinal axis of said stem adaptor at the second end thereof for receiving said spindle, and
   locking means for locking the rotation of said stem adaptor to said spindle, whereby said stem rotates with the rotation of said stem adaptor.

23. In a plumbing valve unit having a valve stem with a first spline at its end that is adapted to mate with a matching first keyway of a particular type of plumbing trim, an adaptive system for allowing plumbing trim of a second type having a second keyway that does not match with the first spline of the valve stem to be used with said valve unit, said adaptive system comprising:
   means for machining a first connection means at the end of said stem having said first spline; and
   a stem adaptor having a second spline at a first end thereof that matches the keyway of plumbing trim of the second type, and further having second connection means at a second end thereof for engaging the first connection means of said stem; and
   means for securely joining the first connection means of said stem to the second connection means of said adaptor so that any torsional forces applied to said stem adaptor are efficiently transferred to said stem.

24. The adaptive system of claim 23 wherein said means for machining said first connection means on the spline end of said stem comprises means for milling a spindle on said stem, said spindle having a diameter less than the diameter of said stem; and wherein said second connection means at the second end of said adaptor includes a hole bored along a longitudinal axis of said stem adaptor at the second end thereof for receiving said spindle; and wherein said means for securely joining the first connection means to the second connection means includes locking means for locking the rotation of said stem adaptor to said spindle, whereby said stem rotates with the rotation of said stem adaptor.

25. The adaptive system of claim 23 wherein said means for machining said first connection means on the spline end of said stem comprises means for drilling an axial hole into the stem; and wherein said second connection means at the second end of said adaptor includes a spindle projecting out along a longitudinal axis of said stem adaptor at the second end thereof for insertion into the axial hole drilled into said stem; and wherein said means for securely joining the first connection means to the second connection means includes locking means for locking the rotation of said stem adaptor to said spindle, whereby said stem rotates with the rotation of said stem adaptor.

* * * * *